Figure 1:
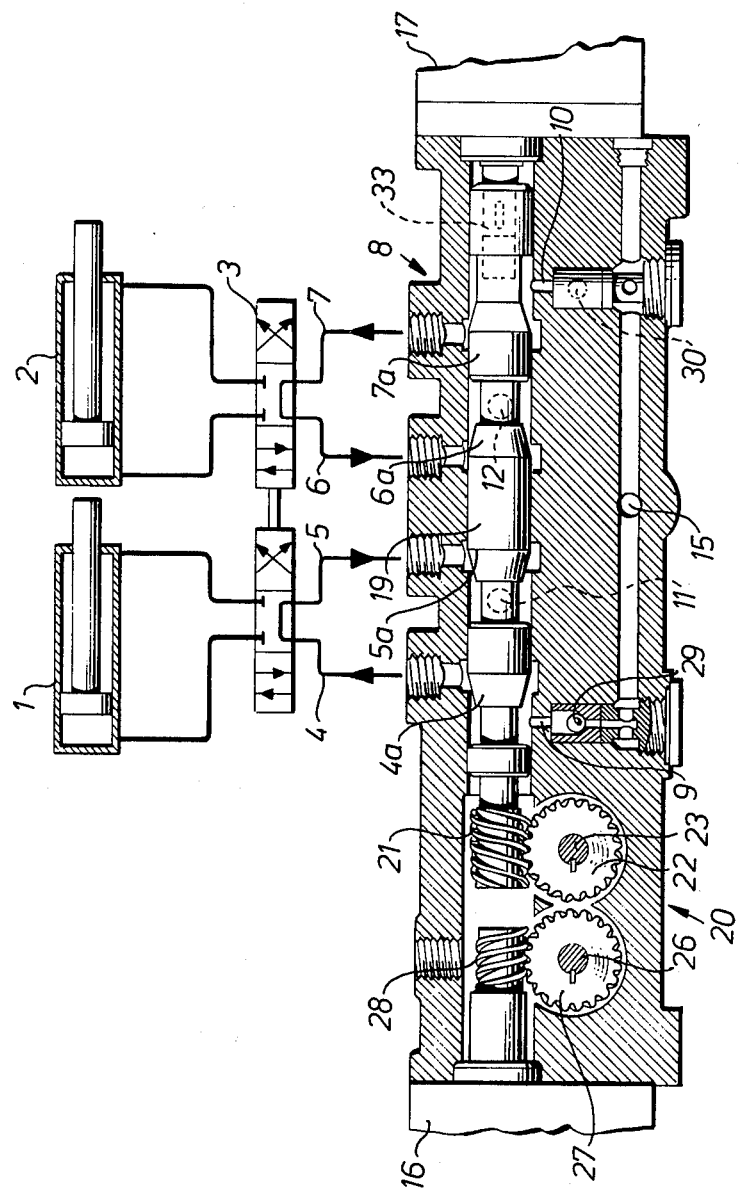

United States Patent [19]

Joelson

[11] 4,120,234
[45] Oct. 17, 1978

[54] DEVICE FOR DISTRIBUTING A FLUID FLOW IN FIXED PROPORTIONS

[75] Inventor: Karl Evert Anders Joelson, Lenhovda, Sweden

[73] Assignee: AB Vabyma, Sweden

[21] Appl. No.: 769,218

[22] Filed: Feb. 16, 1977

Related U.S. Application Data

[63] Continuation of Ser. No. 579,908, May 22, 1975, abandoned.

[30] Foreign Application Priority Data

Jul. 1, 1974 [SE] Sweden ................................ 7408672

[51] Int. Cl.² ............................................ F15B 11/22
[52] U.S. Cl. ...................................... 91/518; 91/532; 137/101
[58] Field of Search ................ 91/412, 413; 137/101; 137/100

[56] References Cited

U.S. PATENT DOCUMENTS

| | | | |
|---|---|---|---|
| 2,460,774 | 2/1949 | Trautman | 137/101 |
| 2,665,122 | 1/1954 | Rowland | 184/6.18 |
| 2,956,577 | 10/1960 | Kirkham | 91/412 |
| 3,033,219 | 5/1962 | Erle | 137/101 |
| 3,437,103 | 4/1969 | Yoshino | 137/101 |
| 3,455,320 | 7/1969 | Garman | 137/101 |
| 3,572,365 | 3/1971 | White | 137/117 |
| 3,850,081 | 11/1974 | Joelson | 91/171 |

FOREIGN PATENT DOCUMENTS

| | | |
|---|---|---|
| 860,072 | 1/1971 | Canada. |
| 374,788 | 4/1971 | Sweden. |
| 382,343 | 10/1972 | Sweden. |
| 460,161 | 1/1937 | United Kingdom. |

*Primary Examiner*—Martin P. Schwadron
*Assistant Examiner*—Abraham Hershkovitz
*Attorney, Agent, or Firm*—Stevens, Davis, Miller & Mosher

[57] ABSTRACT

A device for distributing pressurized fluid to first and second movable consumers while maintaining a fixed ration between the fluid flows to the consumers, including rotary flow value gauges for directing a return flow from each consumer to an associated gauge, a comparator interconnecting the gauges without one gauge being dependent on the other gauge as to the rotation of the gauges and sensing differences between the output flow of the gauges, inlet valves activated by the comparator to regulate the flow to each consumer for maintaining the fixed flow ratio, and throttle valves for the return flow from each consumer and activated by the comparator to throttle the return flow from a consumer to slow down such consumer.

13 Claims, 2 Drawing Figures

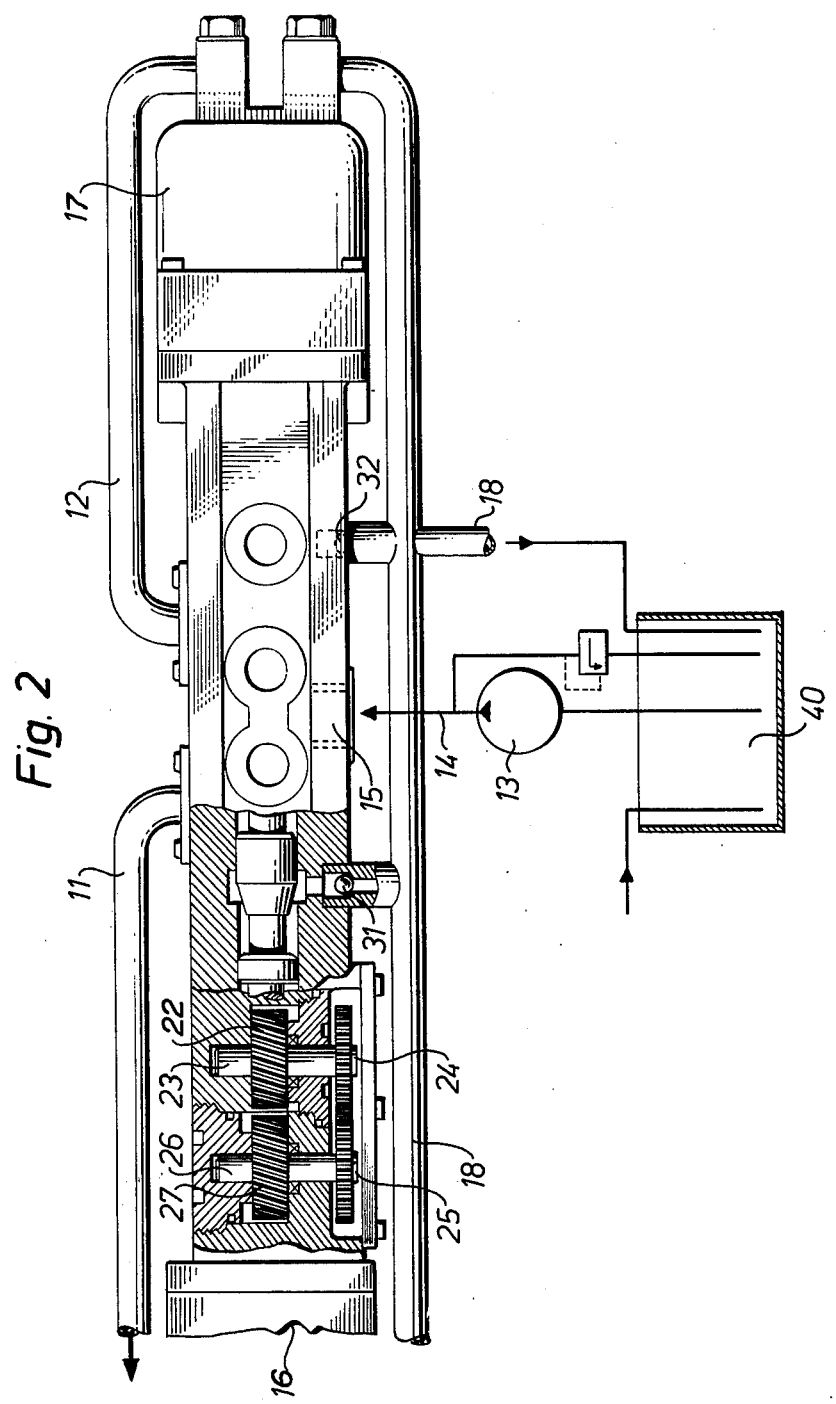

DEVICE FOR DISTRIBUTING A FLUID FLOW IN FIXED PROPORTIONS

This is a Continuation of application Ser. No. 579,908 filed May 22, 1975, now abandoned.

In branches of engineering where flows of fluid for controlling and actuating various operational units are utilized there is often a need for distributing the flow in predetermined proportions between different fluid consumers, for instance in order to synchronize the movement of two or more hydraulic motors. One such application may be in certain folding presses, incorporating a pressing tool that is designed to be actuated by two or more cylinders. In devices of this type it is important that the movements of the pressing tool are such that the tool does not meet the die in an oblique position.

Various control devices have been suggested earlier in order to achieve the desired distribution of the flow. The present invention relates to such devices for distributing a flow of fluid between a first and a second consumer while maintaining a fixed ratio between the consumers, the said devices comprising for each consumer a displacement-type flow value gauge so designed as to sense a flow to or from the consumer, a comparator so designed as to sense differences between the flow value gauges, and a valve arrangement so designed as to be actuated by the comparator and to regulate the flow to each consumer for the purpose of maintaining the predetermined flow ratio between them.

A disadvantage of these earlier control devices is that if one or more of the fluid consumers carries a load that tends to affect the consumer faster than the influx of fluid would do, the consumers will work irregularly despite the proportional distribution of the flow.

Another drawback of the previously suggested devices of this type is that if the fluid pressure to the flow distributor should disappear, the (external) load on the heaviest loaded consumer will press the fluid to the least loaded one, provided that the feed pipes remain open, and the consumers will again operate irregularly.

A third disadvantage inherent in the earlier devices is that a vacuum may develop in the pipes and consumers, should a consumer be forcibly set in motion by an external load when the fluid inlet on the side of increasing volume is closed. This also contributes to the said devices working with less accuracy than is often required.

One object of the present invention is to remove the above mentioned inconveniences.

This object is achieved by a device according to the present invention, which is characterized by the insertion of a throttle valve in the return flow from each consumer, the throttle valves being actuated by the comparator so that at a predetermined comparator deflection the relevant throttle valve will throttle the return flow from the corresponding consumer, thus slowing down the consumer.

The throttle valves should preferably be incorporated in a multivalve arrangement governed by the comparator, for controlling the flows to and from the consumers.

Further, according to the invention, non-return valves may be inserted between the source of flow and the multivalve arrangement so that at a possible drop in fluid pressure an external load on one or more of the consumers will not be able to press fluid through the multivalve arrangement into one or more of the other consumers.

It is also possible according to the present invention to arrange a connection with non-return valves between return pipes from the flow value gauges or a fluid tank and inlet valves to each consumer so that if a drop in fluid pressure should occur fluid will be sucked into the system from the return pipes and the fluid tank, respectively, in case an external load on the corresponding consumer should cause its movement to continue.

The invention can be carried out in a number of ways, one embodiment being described hereinbelow as an example with references to the accompanying drawings of which FIG. 1 is a diagrammatic illustration of the device according to the embodiment concerned as seen from the side and partly in section, and FIG. 2 illustrates the same embodiment as seen from above and partly in section.

FIG. 1 illustrates diagrammatically two consumers (1) (2), in this case double-action hydraulic cylinders. The flows to and from these consumers can be switched by a switching valve arrangement, which is shown diagrammatically at (3) and has three positions, the one shown being a neutral position in which the consumers are not affected. The Figure also shows fluid pipes (4) (5) (6) (7) from or to a multivalve arrangement, here denoted (8) in a general sense, which comprises a port and a valve (4a) (5a) (6a) (7a) for each of the fluid pipes, in the order mentioned. The valves are fitted on a common slide rod (19). Further, the multivalve arrangement is fitted with fluid inlet bores (9) (10) to the spaces surrounding the slide rod at valves (4a) and (7a), respectively. The supply of fluid is provided from a tank (40) by a pump (13), a pipe (14) and an inlet branch (15). The fluid escapes from valves (5a) and (6a) by pipes (11) and (12), which are connected to individual flow value gauges (16) and (17), respectively, and thence to the tank (40) by a common pipe (18). The flow value gauges (16) (17) are hydraulic motors of the rotatory type, the rotation of which depends on the amount of oil that is passed through. The speed of these motors depends on the velocity of the pistons in the cylinders (1) (2).

The slide rod (19) of the multivalve arrangement (8) is rotatable around its longitudinal axis and slidable axially. The axial slide motion is effected by a comparator, here denominated (20) in a general sense, which will be described in detail further on.

The valves (4a) (5a) (6a) (7a) are so arranged that one pair (4a) (5a) throttles the through passage when the slide rod is shifted to the left according to the drawing whereas the other pair (6a) (7a) throttles the flow when the said slide rod is shifted to the right. The valves are so designed that at a given position of the slide rod the valves (4a) and (7a) effect a higher degree of throttling than the other valves (5a) (6a) within each pair of valves (4a) (5a) and (6a) (7a), respectively.

The comparator (20) is designed as a mechanical coupling between the flow value gauges (16) (17) and built so that neither motor will affect the other one with regard to rotation. This is achieved in the following way.

The motor (17) is connected to one end of the slide rod (19) by means of a slide key (33) that enables the slide rod to move axially.

At its opposite end the slide rod (19) carries a worm (21) that meshes with a worm wheel (22) on a shaft (23) that also carries a toothed wheel (24), which engages another toothed wheel (25) on a shaft (26), the latter shaft also carrying a worm wheel (27).

On the shaft of the hydraulic motor (16) another worm (28) is fixed both radially and axially and engages the worm wheel (27). Both worm-gear units being self-locking, none of the motors can affect the other one mechanically. The self-locking effect is achieved by providing the fillets of the worms 21 and 28 with a sufficiently low pitch in order that any attempt to rotate the worm wheels 22 and 27 will not cause any rotation of the worms 21 and 28, respectively.

As can be understood from this design, any deviation in the rotational speed of the motors from a given value (depending on the gear ratio selected) will result in an axial deplacement of the slide rod (19).

The toothed transmission gear comprising the toothed wheels (24) and (25) may be fitted with exchangeable toothed wheels of different sizes, making it possible to apply various gear ratios between the motors (16) and (17). It is also feasible to substitute another type of gear, such as a variator, for the above-mentioned toothed transmission gear, thus enabling the automatic control of the slide rod (19) to be carried out in any desired manner.

By connecting the flow value gauges (16) (17) through the slide rod (19) and by the special design of the gearing it has been possible to achieve a linear overall design despite the incorporation of worm-gear units, thus making this apparatus easy to fit into various structures.

If the reversing-valve arrangement (3) is set in any of its terminal positions, which implies that the cylinders are engaged, then oil under pressure - provided that pump (13) is in operation - will pass through pipe (14), branch off at (15) and enter the valve arrangement (8) by either of the inlets (9) and (10). When the slide rod (19) is in the position shown in the figures the oil passes through valve (4a) or (7a), as the case may be, displacing the pistons in cylinders (1) and (2). These cylinders being double-acting, the movements of the pistons will result in return flows from the cylinders through valves (5a) and (6a) of the multivalve arrangement (8). From this device the return flows will pass through outlets (11) and (12) and thence through flow value gauges (16) and (17) to the fluid tank (40) by means of return pipe (18).

At different loads on the cylinders the flow to the cylinder with the lowest load tends to increase relatively to the flow entering the other cylinder. The same applies to the return flows from the two cylinders. When the flow from the cylinder with the lowest load increases, the flowmeter transmitter sensing this increase will work faster, resulting in a shift of the comparator (20). If for instance the reversing-valve unit (3) is in its extreme left position according to the drawing and cylinder (2) carries the lowest load, the comparator (20) will displace the slide rod (19) to the right in the drawing, resulting in a throttling of valve (7a). The flow to cylinder (2) will consequently diminish, thus compensating for the reduced load. At full load on cylinder (1) the throttling effect of valve (7a) is very strong.

If an external load on one of the cylinders, say on cylinder (2), should act in the same direction as the supply of oil and no valves (5a) and (6a) were present, the said load would move the piston in the cylinder at a faster rate than the hydraulic oil would have done at normal load on the cylinder. With the present design there is instead an increased shifting of the comparator since the external flow drives motor (16) faster than motor (17), resulting in a throttling of valve (6a), reduction of the return flow from cylinder (2) and braking of the cylinder.

If the supply of hydraulic oil to the valve device (8) should be discontinued while the reversing-valve arrangement (3) still permits passage of oil to and from the cylinders the piston in the cylinder subjected to the heavier external load will move in the wrong direction, i.e. the load will press the hydraulic oil through the valve device into the less loaded cylinder. This is prevented by inserting non-return valves (29) (30) in inlet pipes (9) and (10), respectively. These valves prevent any flow of oil back through the valve device (8) and thus act as a safety device until the reversing-valve arrangement (3) has been switched to its closed position, should the hydraulic oil disappear.

If the piston in one of the cylinders is forced by an external load to operate with the oil inlet closed on the side of increasing volume this side will be sujected to a pressure drop. This is prevented by the insertion of non-return valves (31) and (32) which enable oil to pass from return pipe (18) or from the oil tank into the cylinder concerned. This arrangement thus precludes the formation of a vacuum.

As any specialist in this field will realize, a number of embodiments are possible within the general scope of the present invention. So, for example, rotatory hydraulic motors may be used as consumers instead of cylinders. Also, the linear design mentioned above is no prerequisite. On the whole the apparatus may be modified in any desired fashion by designing the throttle valves and the comparator in various ways.

I claim:

1. A device for distributing fluid from a source of pressurized fluid to first and second consumers while maintaining a fixed ratio between the fluid flows to said consumers, including a valve device connected between said source and said consumers and comprising a housing having a bore and a valve slide rotatably and slideably fitted in said bore in said housing and provided with consumer inlet valves adapted to regulate the fluid flow from said source for pressurized fluid to said consumers in dependence upon the axial position of said valve slide, displacement type rotary flow value gauges, means for directing fluid flow consumed by said consumers to an associated gauge, a comparator interconnecting said gauges for sensing the ratio between the fluid flows through said gauges and including two self-locking worm gears with transmission means between them, said valve slide being coupled to the worm of one of said worm gears so as to rotate with said worm and so as to be displaced in said bore of said housing when the proportion between the speeds of rotation of said flow value gauges deviates from a predetermined value.

2. A device according to claim 1, in which the shaft of one of said flow value gauges is coupled to the worm of one of said worm gears by means of said valve slide.

3. A device according to claim 1, further comprising throttle valves for the return flow from each consumer and activated by the comparator to throttle the return flow to slow down the corresponding consumer.

4. A device according to claim 3, in which the consumer inlet valves and the throttle valves are arranged on a common slide rod in a multivalve device.

5. A device according to claim 3, in which the consumer inlet valves include means to completely close the valves before any substantial throttling of the corresponding throttle valves occurs.

6. A device according to claim 3, in which non-return valves are inserted between the source of pressurized fluid and the consumer inlet valves in order that at pressure drops in the fluid no external load on one of said consumers shall force fluid to the other of said consumers.

7. A device according to claim 3, in which a connection is arranged between return flow channels from the flow value gauges and a fluid tank, and between each consumer inlet valve, said connection incorporating non-return valves, so that if a drop in fluid pressure should occur fluid will be sucked into one consumer from a return flow channel and the fluid tank, respectively, in case an external load on the one consumer should cause a continuation of its motion.

8. A device according to claim 1, further comprising the consumers which are double-action cylinders.

9. A device according to claim 1, in which said transmission gear is a toothed transmission gear with exchangeable toothed wheels of various sizes.

10. A device according to claim 1, in which said transmission gear is a variator.

11. A device according to claim 1, in which the flow value gauges have aligned shafts.

12. A device according to claim 3, in which the consumer inlet valves and the throttle valves are arranged on a common slide rod, and the comparator comprises two self-locking worm gears, the worm of one of said worm gears being mounted on said slide rod.

13. A device for distributing fluid from a source of pressurized fluid to first and second consumers while maintaining a fixed ratio between the fluid flows to said consumers, the device comprising:
(a) a housing having a longitudinally extending bore and a valve slide mounted for rotatable and axial movement within said bore, the valve slide having one end terminating within said bore, said one end of the valve slide having a first set of worm teeth;
(b) a plurality of consumer inlet passages in communication with said bore and means on said valve slide to open and close said inlet passages upon axial movement thereof without regard to the rotary position of the valve slide;
(c) two displacement type rotary value gauges, each connected to a return line from a different one of said consumers, the output of one of said gauges being connected to rotatably drive said valve slide and said first set of worm teeth;
(d) two self-locking worm gears fixed to a pair of shafts which are coupled to each other for simultaneous rotation, one of said worm gears being rotatably driven by said first set of worm teeth; and
(e) a second set of worm teeth rotatably driven by the other of said displacement type rotary value gauge and connected to rotatably drive the other of said worm gears so that said valve slide will remain axially stationary when said two displacement type rotary value gauges are rotating at a constant ratio but will move axially when that ratio varies.

* * * * *